United States Patent Office 3,442,830
Patented May 6, 1969

3,442,830
POLYURETHANE COMPOSITION
Colin Reginald Thomas, Kingsclere, Newbury, England, assignor to United Kingdom Atomic Energy Authority, London, England
No Drawing. Continuation of application Ser. No. 444,393, Mar. 31, 1965. This application Jan. 31, 1967, Ser. No. 613,040
Claims priority, application Great Britain, Apr. 6, 1964, 14,160/64
Int. Cl. C08g 22/44, 22/16, 22/10
U.S. Cl. 260—2.5
3 Claims

ABSTRACT OF THE DISCLOSURE

A novel polyurethane composition consists of a reaction product of a cyclic polyester having a hydroxyl value in the range 450 to 850, and a cyclic polyisocyanate, the polyester being formed from a non-halogenated bicyclic polycarboxylic acid, or anhydride thereof, having one or more saturated hydrocarbon substituents, and a non-halogenated trifunctional or higher polyhydric alcohol, a portion of the polyester being added to the cyclic polyisocyanate to form a prepolymer, with the remaining polyester being added to the prepolymer, the cyclic portions of the polyisocyanate and polycarboxylic acid or anhydride being free from combined nitrogen. Polyurethane foam can be formed by adding a foaming agent to the mixture of prepolymer and remaining polyester.

---

This application is a continuation of application S.N. 444,393, filed Mar. 31, 1965, now abandoned.

This invention relates to polyurethanes, that is to polymers of a polyfunctional isocyanate with a polyhydroxyl organic compound.

An object of the invention is to provide a new polyurethane having physical characteristics which make it suitable for the production of load-carrying rigid foams having improved strength at elevated temperature.

The invention comprises a polyurethane consisting of a reaction product of a polyster, having a high hydroxyl value in the range 450 to 850, and a cyclic polyisocyanate, the said polyester being formed from a cyclic polycarboxylic acid or corresponding anhydride and a polyhydric alcohol, and the cyclic portions of the polyisocyanate and polycarboxylic acid or anhydride being free from combined nitrogen.

The hydroxyl value is expressed as mg. of KOH per gram of polyester as is known in the art, a hydroxyl value of 1 corresponding to 1/56.1 equivalents of hydroxyl groups per kilogram of polyester. A preferred hydroxyl value range for the polyester is 670 to 850 in particular 750 to 850. The higher values lead to improved strength at high temperatures. In the past the beneficial effect of high hydroxyl values has not been appreciated.

The cyclic polyisocyanate preferably contains two isocyanate groups per molecule. The cyclic portion may be carbocyclic or heterocyclic, carbocyclic being preferred. Among substituted heterocyclic ring systems which could be used may be included furan, thiophen, coumarone, thiocoumarone, pyran and thiopyran.

The carbocyclic ring may be alicyclic.

It is to be understood that polycyclic ring systems which are partially saturated may be used and are preferred.

For reasons of stability the ring systems should preferably contain 5, 6 or 7 members, these rings containing the minimum strain energy.

Preferred isocyanates are represented by the formula $(R_1\text{-}R_2\text{-}R_3)\, NCO)_n$ in which $R_1$ and $R_3$ are groups attached directly to $R_2$
$R_2$ is an aromatic ring system,
$R_1$ and $R_3$ are hydrogen, or $C_1$ to $C_9$ alkyl, aryl, aralkyl or alkaryl groups,
$n$ is an integer not less than 2 and the (NCO) groups are attached to one or more of the $R_1$, $R_2$ and $R_3$ groups.

As exemplary substances which may be used we may cite the following:

(a) $R_1$ is hydrogen, $R_2$ is the $C_6H_2$ aryl group, $R_3$ is methyl and $n$ is 2, this being tolylene di-isocyanate, (b) $R_1$ is hydrogen, $R_2$ is the $C_6H_2$ aryl group, $R_3$ is the $CH_2\text{-}C_6H_4$ alkaryl group, $n$ is 2 and one only (NCO) group is attached to an aryl group, this compound being diphenyl methane di-isocyanate, (c) $R_1$ and $R_3$ are the $C_6H_4\text{-}CH_2$-alkaryl groups, $R_2$ is the $C_6H_3$ aryl group, $n$ is 3 and one only (NCO) group is attached to an aryl group, this compound being di(isocyanatobenzyl)phenyl isocyanate.

The cyclic polycarboxylic acid or its corresponding anhydride may contain ring systems as discussed above with respect to the polyisocyanate.

Preferred polycarboxylic acids can be represented by the formula $(R_1\text{-}R_2\text{-}R_3)\,(COOH)_n$ in which $R_1$ and $R_3$ are attached directly to $R_2$
$R_2$ is a mono or bicyclic ring system,
$R_1$ and $R_3$ are hydrogen or $C_1$ to $C_9$ alkyl, aryl, aralkyl or alkaryl groups,
$n$ is an integer not less than 2 and the (COOH) groups are attached to one or more of the $R_1$, $R_2$ and $R_3$ groups.

A bicyclic ring system is particularly preferred. It is preferred that $n$ be 2.

Exemplary materials are:

(a) $R_1$ is $CH_3$, $R_2$ is bicyclic, having two 5 membered rings, and is $C_7H_6$, $R_3$ is H, $n$ is 2, this being methyl bicyclo 2:2:1 hept-5-ene 2:3 dicarboxylic acid. The anhydride of this material would normally be used.

(b) $R_1$ and $R_3$ are H, $R_2$ is $C_6H_2$, $n$ is 2, this being phthalic, isophthalic or terephthalic acid. The anhydride of this material would normally be used.

The functional groups in the polyisocyanate and the polycarboxylic material may be attached directly to the ring or they may be terminal groups to hydrocarbon chains each consisting of up to three carbon atoms.

The polyhydric alcohol is preferably trihydric or tetrahydric. It may include ether linkages. A specifically preferred polyhydric alcohol is trimethylolpropane. Other polyhydric alcohols which may be used include trimethylolethane, glycerol, 1.2.6 hexanetriol and pentaerythritol.

The formation of the polyurethane from the above components may comprise reacting the polyhydric alcohol with the polycarboxylic acid or its anhydride, water of esterification being removed if desired, to form the polyester, the proportions of the reactants being adjusted to give the desired hydroxyl value, reacting a portion of the polyester with the polyisocyanate to produce a reaction product having a number of unreacted isocyanate groups, allowing heat of reaction to dissipate and then adding the remaining quantity of polyester required to form the polyurethane. Alternatively the polyester may be formed by ester interchange, for example by forming the methyl ester initially, heating this with the polyhydric alcohol, the reaction being accelerated by a catalyst, and removing the methanol so formed. The relative proportions of the alcohol and the acid or anhydride are determined by the desired hydroxyl value of the polyester as is known in the art. It is preferred to use substantially stoichiometric amounts of the isocyanate component and the polyester in the formation of the polyurethane.

The formation of foam involves the use of a bubble-forming gas or vapour within the bulk of the material undergoing polymerisation. The rate of expansion of the bubbles must be related to the rate of polymerisation of the polyurethane so that the expansion of the bubbles ceases when the optimum bubble size is reached, thereby controlling the density of the foam.

The bubbles can conveniently be produced by the reaction of water with isocyanate, which reaction produces carbon dioxide and amino derivatives of the isocyanate. As an alternative to water plus excess isocyanate, the foaming agent can be a low boiling point inert liquid mixed with the reactants to form vapour during the exothermic process. Suitable liquids include fluorinated or chloro-fluorinated hydrocarbons boiling below the peak exotherm temperature. The control of the foam-producing stage in polyurethane compositions is extremely critical as is known in the art, the first 30 seconds after the mixing of the components being the critical stage determining the difference between making a foam or not.

The following examples illustrate the invention.

Example 1

One mole of dry trimethylolpropane was mixed under nitrogen with 0.55 mole of methylbicyclo 2:2:1-hept-5-ene-2:3 dicarboxylic anhydride at 210° C. with stirring, water of esterification being removed. A polyester having a viscosity of 19500 poise at 25° C., and a hydroxyl value of 480 was produced. ⅙ of the required quantity of the polyester was mixed with tolylene diisocyanate to form a liquid polyurethane prepolymer, external cooling being applied to remove heat of reaction and keep the temperature below 70° C.

The temperature of the reaction mixture was lowered to room temperature and the remaining ⅚ of the polyester was added, cooling being applied as before.

The polyurethane so formed was liquid and was degassed under vacuum before gelation occurred. It was then post cured at 100–120° C. for six hours to produce a bubble free casting which examination under polarised light showed to be free from mechanical strain.

A block of this material, machined as a cube of side 0.50 inch was compressed in jaws at a rate of 0.25 inch/minute. There was a sharp yield point at 6% compression, the compressive yield strength being 2900 p.s.i.

In contrast with this, the compressive yield strength of known cast resins is normally about 18,000 p.s.i. under similar conditions.

Example 2

A liquid polyurethane prepolymer was formed by the method given in Example 5 below.

4340 gms. of the prepolymer prepared from 1 part by weight of polyester and 5.8 parts tolylene diisocyanate were mixed with 2250 gms. of the same polyester to which had been added 13.5 gms. of water and 16.9 gms. of silicone oil foam stabiliser commercially available under the name "Union Carbide L520" (which is a block copolymer of polyoxyalkylene and polydimethylsiloxanes).

The stirred mixture was poured into a tray and allowed to rise. It was then transferred to an oven and cured for 8 hours at 150° C. to produce a rigid foam having a density of 0.20 gm./c. c., that is, 15.75% of the density of the solid block of Example 5.

This foam had a compressive yield strength of 600 p.s.i. at 10% strain at room temperature.

The glass-rubber transition temperature of this foam was above 150° C. and its compressive strength at 150° C. was 50% of its strength at room temperature.

In contrast with this, conventional rigid polyurethane foams are incapable of acting as load-bearing materials at such high temperatures.

Example 3

The process of Example 1 was repeated using 0.43 moles of anhydride per mole of trimethylolpropane, to produce initially a polyester having a hydroxyl value of 570 and a viscosity of 7900 poise at 25° C. Under the same test conditions as above the resin showed a compressive yield strength of 29600 p.s.i.

Example 4

The process of Example 1 was repeated using 0.35 moles of anhydride per mole of trimethylolpropane to produce initially a polyester having a hydroxyl value of 679 mg. KOH/gm. and a viscosity of 2260 poise at 25° C.

Under the same test conditions as above the resin showed a compressive yield strength of 31600 p.s.i.

Example 5

The process of Example 1 was repeated within 0.25 moles of anhydride per mole of trimethylolpropane, to yield initially a polyester having a hydroxyl value of 794 mg. KOH/gm. and a viscosity of 1250 poise at 25° C.

Under the same test conditions as above the resin showed a compressive yield strength of 32500 p.s.i.

Example 6

One mole of trimethylolpropane was esterified with 3.5 moles of phthalic anhydride under nitrogen at 220° C. to produce a polyester having a hydroxyl value of 780 and a viscosity at 50° C. of 474 poise.

1 part by weight of the polyester was mixed with 6 parts by weight of tolylene di-isocyanate at 60° C. to form a liquid polyurethane prepolymer. 290.4 parts by weight of this prepolymer were mixed at 60° C. with 100 parts by weight of the polyester to which had been added 0.25 parts by volume of a silicone oil foam stabiliser commercially available under the name "Union Carbide L520," 2.7 parts by volume of Lissapol NX being a commercially available non-ionic detergent which is primarily a polyethylene oxide-alkyl phenol condensate, and 0.10 parts by volume of catalyst SFC being a commercially available tertiary amine (dimethylcyclohexylamine). Foaming developed quickly and the foam was transferred to an oven and cured at 175° C. for 4 hrs.

This foam had a density 0.2 gm./c. c.

It had a compressive yield strength of 650 p.s.i. at 10% strain at room temperature at 300 p.s.i. at 10% strain at 150° C.

Example 7

One mole of trimethylolpropane was esterified with 3.54 moles of isophthalic acid under nitrogen at 220° C. to produce a polyester having a hydroxyl value of 810 and a viscosity of 265 poise at 50° C.

1 part by weight of the polyester was mixed with 6 parts by weight of tolylene di-isocyanate at 60° C. to form a liquid polyurethane prepolymer. 270 parts by weight of this prepolymer were mixed at 60° C. with 100 parts by weight of the polyester to which had been added 0.25 parts by volume of "Union Carbide L520," 0.10 parts by volume of catalyst SFC and 2.7 parts by volume of Lissapol NX.

Foaming developed rapidly and the foam when formed was cured at 175° C. for 4 hours.

This foam had a compressive strength at 10% strain of 600 p.s.i. at room temperature and 300 p.s.i. at 150° C.

Example 8

One mole of trimethylolpropane was esterified with 3.54 moles of terephthalic acid under nitrogen at 220° C. to produce a polyester having a hydroxyl value at 755 and a viscosity of 242 poise at 50° C.

1 part by weight of the polyester was mixed with 6 parts by weight of tolylene di-isocyanate at 60° C. to form a liquid polyurethane prepolymer.

228 parts by weight of the prepolymer were mixed at 60° C. with 100 parts by weight of the polyester to which had been added 0.1 parts by volume of catalyst SFC 0.25 parts by volume of "Union Carbide L520," and 1.8 parts by volume of Lissapol NX. Foaming began quickly and the foam was cured at 175° C. for 4 hours.

This foam had a compressive yield strength at 10% strain of 650 p.s.i. at room temperature and 300 p.s.i. at 150° C.

Example 9

One mole of trimethylolpropane was esterified under nitrogen at 220° C. with 3.61 moles of hexahydrophthalic anhydride to give a polyester having a hydroxyl value of 769 and a viscosity of 211 poise at 50° C.

1 part by weight of the polyester was mixed with 6 parts by weight of tolylene di-isocyanate at 60° C. to form a liquid polyurethane prepolymer.

238 parts by weight of the prepolymer were mixed at 60° C. with 100 parts by weight of polyester to which had been added 0.1 parts by volume of catalyst SFC 0.25 parts by volume of "Union Carbide L520" and 1.8 parts by volume of Lissapol NX.

Foaming began quickly and the final foam was cured at 175° C. for 4 hours.

This foam had a compressive yield strength at 10% strain of 550 p.s.i. at room temperature and 350 p.s.i. at 150° C.

The polyesters of Examples 6 to 9 had high viscosities at room temperature and were therefore somewhat difficult to mix with the isocyanate which is a water-like liquid.

It is claimed:

1. A rigid polymeric polyurethane foam having high strength at elevated temperatures consisting essentially of a foamed reaction product of a polyester composition having a hydroxyl value in the range 450–850, and a cyclic polyisocyanate, said polyester composition being formed from at least one non-halogenated bicyclic polycarboxylic acid or corresponding anhydride having a $C_1$–$C_9$ alkyl substituent and a single double bond per ring structure and an at least trifunctional, non-halogenated polyhydric alcohol selected from the group consisting of trihydroxy alcohol and tetrahydroxy alcohol, a portion of the polyester composition being added to the cyclic polyisocyanate to form a prepolymer and the remaining polyester composition and a foaming agent being added to the prepolymer, the cyclic portions of the polyisocyanate and polycarboxylic acid or anhydride being free from combined nitrogen.

2. A polymeric polyurethane foam as claimed in claim 1 wherein the polymeric polyester composition has a hydroxyl value in the range 670 to 850.

3. A polymeric polyurethane foam as claimed in claim 1 in which the polycarboxylic acid is methyl bicyclo 2:2:1-hept-5-ene-2:3 dicarboxylic acid.

References Cited

UNITED STATES PATENTS

| | | | |
|---|---|---|---|
| 2,479,486 | 8/1949 | Gerhart | 260—45.4 |
| 2,964,482 | 12/1960 | Leary et al. | 260—22 |
| 3,071,597 | 1/1963 | Kaver | 260—346.3 |
| 3,094,556 | 6/1963 | Wiese et al. | 260—514 |
| 3,287,395 | 11/1966 | Chang | 260—468 |

DONALD E. CZAJA, *Primary Examiner.*

MICHAEL B. FEIN, *Assistant Examiner.*